Jan. 1, 1952          W. H. GREEN          2,580,761

SLURRY TYPE LIQUID TREATING APPARATUS AND PROCESS

Filed Dec. 4, 1948          3 Sheets—Sheet 1

INVENTOR.
Walter H. Green
BY Charles W. Lindrooth
ATTORNEY

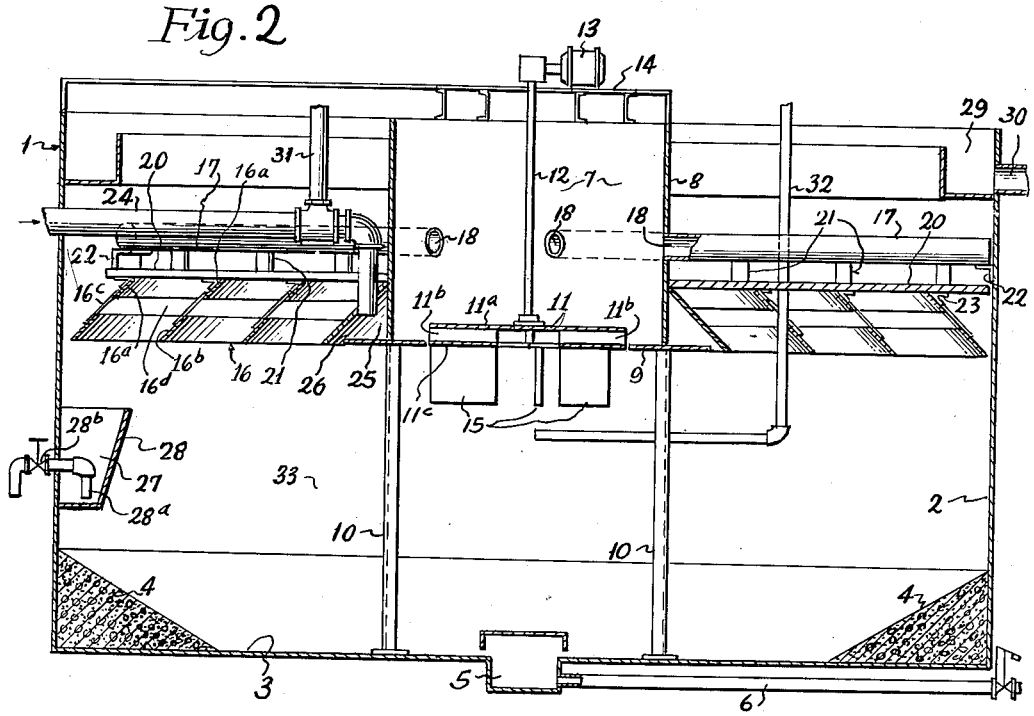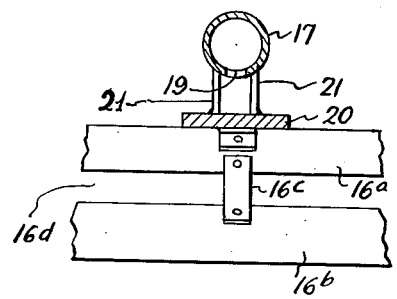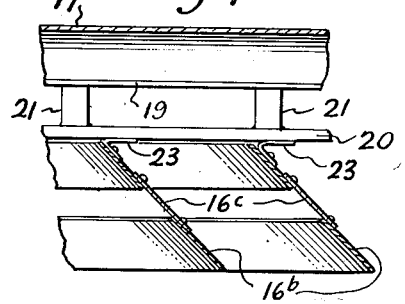

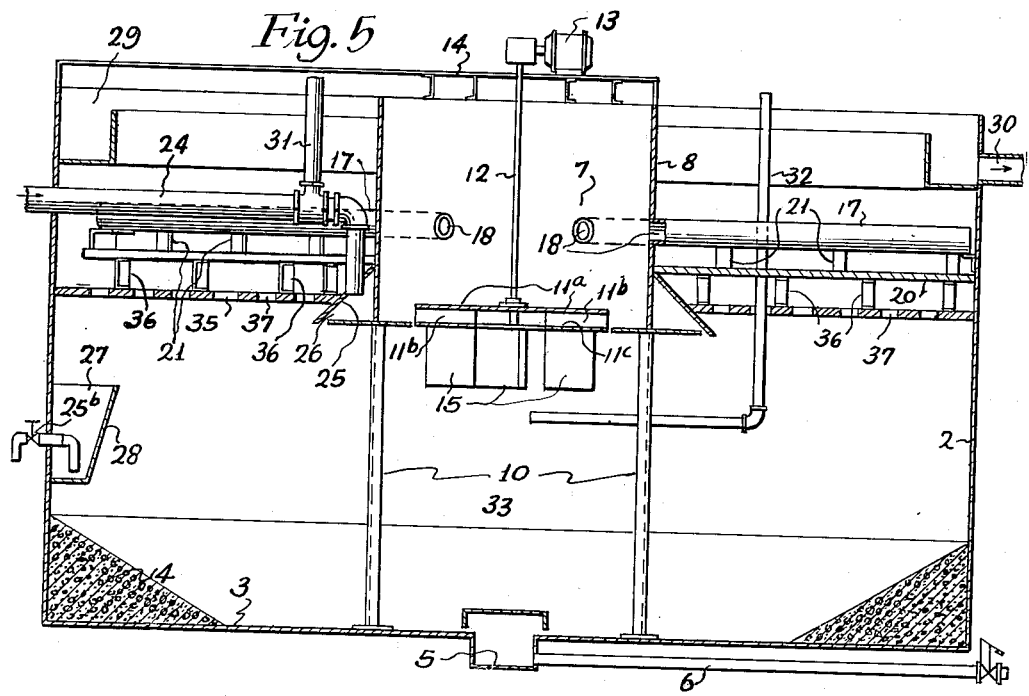

Patented Jan. 1, 1952

2,580,761

UNITED STATES PATENT OFFICE 2,580,761

SLURRY TYPE LIQUID TREATING APPARATUS AND PROCESS

Walter H. Green, Batavia, Ill., assignor to Infilco Incorporated, Chicago, Ill., a corporation of Delaware Application December 4, 1948, Serial No. 63,461

16 Claims. (Cl. 210—16)

This invention relates to the treatment of water and other liquids and more particularly to the provision of a novel form of apparatus of improved type for such purpose and to the concommitant improvement in the operation of such apparatus and of the process carried out therein.

More specifically my invention is directed to apparatus of the type wherein and whereby there is maintained a volume of a suspension comprising liquid undergoing treatment and a concentration of solids retained and accumulated therein from previously treated liquid, such suspension being commonly spoken of as a slurry and being used in the treatment of the liquid.

One object of the present invention is to simplify and to reduce the size and the cost of such apparatus, and along with the reduction in size to enlarge, at least relatively, the size of the treating chamber or zone in which agitation is maintained, and thus increase the efficiency of operation thereof.

Another object is to provide simple and yet effective means, partly structural and partly functional, for confining agitation within its proper and intended zone.

A further object of my invention is to provide a simple baffle structure so constructed as to confine agitation of the slurry to a space within the lower part of the treatment tank, and to provide a relatively deep zone of agitation extending entirely across the tank and an upper and shallower zone of quiescent slurry from the upper surface of which clear water escapes, these zones having free communication through the baffle structure.

Another object is to continuously raise and distribute slurry from the lower zone over this baffle structure in amount sufficient not only to maintain the clear water escape surface of the slurry in the space above this baffle structure, but also to maintain a downward flow through this structure.

Another more detailed object of my invention is to provide a baffle structure surrounding a central flow distribution chamber and to laterally distribute slurry over the top of this structure so as to confine circulation and agitation of the liquid undergoing treatment within the lower part of the treatment tank, the baffle structure including a plurality of laterally spaced vertically extending inclined baffle members, the individual baffles being divided longitudinally into upper and lower sections with a longitudinal gap therebetween, thereby to confine the flow induced by the flow across the lower edges of the baffle members to the lower part of the space between said baffle members.

The treatment of liquid in and by a suspension or slurry of liquid undergoing treatment and of solid particles separated and accumulated from previously treated liquid is not new and the advantages gained by such a process are well known to those skilled in the art. Also various structures have been proffered and used as apparatus in which and by which such a type of treatment may be carried out. The present invention is an improved form of such apparatus in which some known features and parts of the prior art are embodied or utilized. Some of these features or parts, however, have been materially modified or rearranged to adapt them to the new intended use, while certain others have been omitted, and new features have been introduced, to provide a new structure and process in a new and improved way.

The apparatus heretofore employed and the manner in which the slurry is utilized therein in carrying out the treatment, may be divided into two classes, one being what is commonly spoken of as the "sludge blanket" or "up flow" type. In this class the liquid on its way to the outlet and for purposes of clarification, is caused to flow or filter upwardly through a considerable depth of the suspension or slurry in a clarification chamber or zone, the upward velocity of the liquid serving to sufficiently maintain solids in suspension in such zone but not to carry them upward beyond a certain limit or level, at which level the slurry abruptly stops, the clarified liquid escaping from the surface of the slurry for discharge.

In the other class the treated liquid on its way to the outlet, and while still in the form of or contained in slurry, is discharged laterally into or across a clarification zone, at the top or in an upper level of slurry in that zone, and normally in an amount in excess of the rate of throughput. Clarified liquid escapes abruptly from the surface of the normally laterally moving upper layer of slurry while at the same time, and below the escape surface, there is a downward flow or current comprising the slurry discharged above in excess of the throughput amount. This type is frequently spoken of as the "lateral flow" type. In this type the depth of slurry through which liquid rises to the escape surface is or may be very small, at times only a fraction of an inch.

The apparatus of the present invention is so constructed as to be particularly adapted to be operated utilizing the lateral flow principle.

All apparatus of the slurry utilizing type have certain common features although they may and do differ widely in appearance and in details of construction. Thus all such apparatus have a chamber or zone, sometimes called a mixing or reaction or treating chamber or zone, that is filled with or contains slurry and the contents of which are kept in agitation by some suitable means, to prevent subsidence of the solids suspended in the liquid therein. The liquid to be treated and the treating reagents are directly or indirectly delivered into this chamber and held there for a while, being mixed with the slurry therein. From this first zone the liquid passes into or through what may be spoken of as a clarification zone and so to the treated liquid outlet. Between these two zones there is some form of structural separation for the purpose of preventing undue motion of the liquid, due to the agitation in the first zone, extending into the latter zone.

In the present apparatus it is proposed to change the usual proportions of these zones in such a manner as to provide a relatively large and deep mixing zone and a relatively shallow upper quiescent zone in which the slurry level is maintained and from which clarified liquid escapes. It is also proposed to provide substantially open communication between the two zones over the whole of their adjacent areas, so that liquid and solids may freely pass from one zone to the other, while at the same time the agitation and circulation maintained in the mixing zone is confined thereto, so as not to interfere with clarification.

For purposes of exemplification, my invention will be illustrated by the accompanying drawings showing a quite simple and yet advantageous form of structure, and described in connection therewith, although of course other embodiments from the structural aspect are possible and will suggest themselves to those skilled in the art of liquid treatment.

In the drawings:

Figure 2 is a transverse sectional view taken along line 2—2 of Figure 1;

Figure 3 is an enlarged detail view showing certain details of construction of the circular baffles, which are not shown in Figure 1;

Figure 4 is an enlarged fragmentary transverse sectional view taken substantially along line 4—4 of Figure 1 and showing certain details of the mounting of a deflector plate and baffles on a slurry discharge pipe;

Figure 5 is a transverse sectional view taken through the apparatus and illustrating a modified form in which my invention may be embodied; and Figure 6 is a fragmentary plan view of the modified form of apparatus shown in Figure 5.

Figure 1:
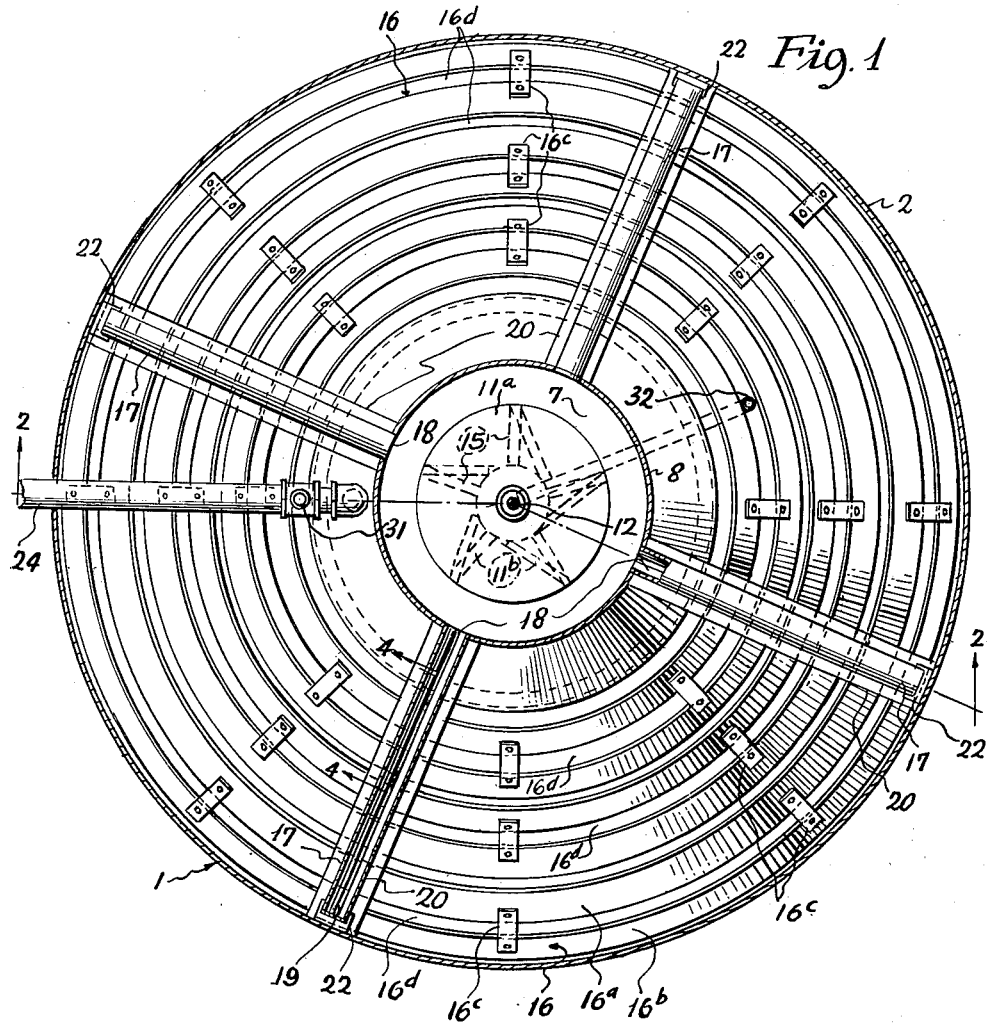
Figure 1 is a plan view of one form of apparatus constructed in accordance with my invention with parts broken away and shown in horizontal section.

In the embodiment of my invention illustrated in Figures 1 to 4 of the drawings, 1 designates a tank that may normally but not necessarily be circular and may have a side wall 2 and a floor 3. Usually there is a sloping corner fill 4 at the floor of such a tank and usually it has been necessary that the inside slope of such a fill be at an angle of about 45° or steeper, to prevent deposits from remaining thereon. In the apparatus of my invention, however, the slope may be much less than 45°, and in some cases the floor of the tank is so effectively washed by the currents of the agitating and circulating flow of the slurry in the lower part of the tank during operation of the apparatus, that the fill may be omitted entirely. In the center of the floor of the tank and of the agitating and circulating flow is shown a blow-off pit 5 having a discharge conduit 6 leading therefrom.

In the central upper part of tank 1 is a flow distribution chamber 7, herein shown as being formed by a cylindrical wall 8, although not necessarily cylindrical, and having a bottom in the form of an annular plate 9, herein shown as extending beyond the periphery of said wall. This chamber may be supported in the tank in any suitable way and is herein shown as being supported by spaced vertical legs or columns 10 extending upwardly from the floor 3. The top edge of wall 8 is above the normal water level in the tank 1, to prevent liquid from passing over the top of said chamber into the clear water space outside of said chamber.

In the bottom of chamber 7 associated with the opening in the annular plate 9 is a rotor member 11, carried on the lower end of a shaft 12. Said shaft is suitably journaled for rotation about a vertical axis and is driven by a motor and reducer indicated generally at 13. The motor and reducer 13 may be of a well known type so need not herein be shown or described in detail, and are suitably mounted on a bridge 14 extending from the side wall 2 of the tank to and across the top of the cylindrical wall 8 of the chamber 7. In smaller apparatus this bridge may extend entirely across the tank from wall to wall and may also serve to support said chamber 7.

The upper part of the rotor 11 may be disposed just above the floor of the chamber 7 in vertical alignment with the open portion of the annular plate 9 and serves as a pumping member. Said pumping member may be formed by a plate 11a secured to the lower end of the shaft 12 and having pumping vanes 11b depending from said plate. An annular plate 11c may be suitably secured to the lower ends of said pumping vanes and is herein shown as being disposed in horizontal alignment with the plate 9. The opening in said annular plate 11c may serve as an inlet for liquid from the space below the chamber 7, which may be drawn upwardly from said space to within said chamber by said pumping vanes 11b.

The lower part of the rotor 11 may have radial agitator blades 15 extending downwardly from the annular plate 11c through the opening in the annular plate 9 into the space below said chamber, which space may form a mixing and reaction zone or chamber 33. Said agitator blades may be so positioned and arranged as to set up an agitation and circulation in said mixing and reaction zone, of a form which is commonly spoken of as a rotating vortex type of circulation, wherein the liquid flows laterally from said agitator blades towards the side wall of the tank, and then downwardly and inwardly along the floor of the tank and upwardly to said agitator blades.

Surrounding the lower part of distribution chamber 7 is shown a partition or baffle structure comprising a series of laterally spaced concentric annular baffles 16, herein shown as being of a hollow frusto conical form. These baffles may be supported in any desired way but are advantageously supported on and depend from a series of radial conduits or pipes 17 extending from the wall 8 of the central chamber 7 to or adjacent the wall 2, and suitably supported at their opposite ends on said walls of said chamber and tank. The pipes 17 open at their inner ends at 18 through the wall 8 into the chamber 7 and may be closed at their outer ends. Each of said pipes may have a discharge along its underside which may be a series of holes, but which is herein indicated as being a slot 19 extending along and opening from the bottom of each pipe (see Figure 3). A horizontally extending deflector plate 20 is spaced beneath and extends along each pipe 17 and is shown as supported thereon by means of hangers 21, secured to and depending from each pipe. Said deflector plates serve to laterally deflect the liquid discharged from said pipes. In some instances it is desirable to have the ends of the pipes 17 open, in which cases said pipes will stop short of the side wall of the tank and may be supported at their outer ends on the side wall of the tank by support brackets 22, herein shown as being secured to said side wall and extending inwardly therefrom and having the ends of said pipes suitably supported thereon. The baffles 16 in turn are shown to depend from and to be supported from the deflector plates 20 by means of angle brackets 23, secured to the bottoms of said plates and having said baffles secured thereto.

In some cases, as for instance where the radial distance between walls 8 and 2 is small, the pipes 17 may be omitted and the discharge from chamber 7 may be directly through openings 18. If desired the openings 19 in the bottom of pipes 17 may diverge as they extend outwardly from the wall 8 toward the wall 2 of the tank to discharge increasing volumes of liquid toward their outer ends as the area to be served increases.

A raw water inlet 24 is shown as discharging into an annular conduit 25, extending around the lower portion of the wall 8, the bottom of which conduit is formed by the top surface of the plate 9. Said conduit is herein shown as being of a triangular form in cross section and as having a discharge slot 26 adjacent its lower outer periphery at the outer edge of the plate 9, for delivering liquid into the mixing and reaction zone 33 in the tank 2, in the direction of the flow set up by the agitator blades 15.

It should here be understood that while the edges of the baffles 16 are shown as being spaced from the wall 8 of chamber 7, that said baffles and wall functionally serve to separate the agitation zone 33 from a relatively quiescent zone of slurry above the baffles, and to prevent the circulation in the lower zone from unduly disturbing quiescence in the upper zone. For the purpose of this invention said wall and baffles and the annular plate 9 may, therefore, be considered as one partition structure.

At 27 is indicated a concentrator chamber formed by a partition 28 and a section of wall 2 in a well known manner. A sludge outlet 28a leads from the lower portion of said concentrator chamber and a discharge valve 28b is provided, to selectively control the removal of solids therefrom. Such concentrators are well known to those skilled in the art and need not be described in detail.

Surrounding the top of tank 1 is a take-off launder 29 from which leads an outlet conduit 30. Reagent supply pipes 31 and 32 are shown, the one as delivering into inlet pipe 24 and the other as delivering directly into the mixing and reaction chamber 7. As is well known to those skilled in the art the actual point or points of delivery of reagent to liquid to be treated depends upon various factors and may advantageously be varied from case to case and even from time to time in individual cases, so that no more is intended here than to indicate suitable reagent delivery means.

It will be obvious that with the action of the water discharged through the slot 26 and the action of the agitator blades 15, there will be set up a strong outward flow of slurry containing water undergoing treatment, with its contained precipitate or other solids, just below the bottom of the baffles 16. This flow approaching the side walls 2 will turn downward and will return along and above the floor and rise again to agitator blades 15, to repeat the cycle. This agitation and circulation must be such as to retain the solids in the slurry in chamber 33 in suspension, except perhaps some of the largest and heaviest particles, which may soon drop to the floor. It will be apparent that the raw water entering chamber 33 through the slot 26 will be quickly absorbed in the slurry due to the flow caused by agitator blades 15.

Those understanding hydraulic action will know that such a flow along the bottom of baffles 16 will induce a downward flow along the approach sides of said baffles 16 and a corresponding up flow on the opposite sides of said baffles in the space between them, and that this may, under some circumstances, become objectionable in amount and effect. Such effect may be minimized in various ways and one way I have found very effective is to divide the baffles 16 into spaced apart upper and lower sections 16a and 16b respectively and to connect them together by spacing strips or clips 16c so as to have a longitudinal gap 16d extending therebetween, as shown in Figures 1 and 3. With this construction the total width or height of the baffles may be decreased over the height that would be required if continuous baffles were used, and the gap 16d permits the induced flow to be largely or entirely confined to the lower part of the space between the baffles.

Assuming that water is to be treated for softening and that the tank is filled, raw water is discharged into the upper part of the mixing and reaction chamber 33 from the annular conduit 25 through the slot 26. The rotation of rotor 11 will cause the agitating and circulating blades 15 to set up and maintain in the mixing and reaction chamber 33, an agitation and circulation of what is frequently spoken of as the rotating vortex type, a form that, as is well known, is very advantageous in such a case. The size of the rotor must of course be adapted to the particular case, but in general the peripheral speed of the blades 15 will be from 2' to 4' per second, although sometimes speeds outside this range are permissible or even desirable. Normally and preferably, the dimensions of the blades should be such that at the chosen peripheral speed the contents of chamber or zone 33 will be overturned once in from about 1 to about 3 minutes, the volume of said chamber being usually such as to hold from about 10 to about 45 times the normal throughput flow per minute.

During operation, the upper part of rotor 11, which is in effect the rotor of a centrifugal pump, will draw up slurry from mixing zone 33 and discharge it into chamber 7. From this chamber it will flow out through openings 18 or the radial pipes 17, the number and size of which is of course dependent upon the size of the apparatus or the quantity of throughput, and will, if the pipes be used, be discharged through the openings 19 in the bottom of said pipes and deflected laterally above the baffles 16 by the deflector plates 20. In this way a relatively quiescent layer or shallow pool of slurry is maintained above the baffle or partition structure, the surface of which pool forms the clear water escape surface. As noted before, the pump normally discharges to the quiescent pool a substantially greater quantity of slurry than is needed to supply the throughput quantity of treated water. The excess flows down through the openings or spaces in the baffle structure and this aids in restraining turbulence in the mixing and reaction chamber from extending through the baffle structure.

It is understood that this apparatus is intended to be operated to carry out the liquid treatment in or by what has come to be known as a slurry type treatment of the lateral flow type. In such treatment the solid particles entering with the raw water or formed by the action of reagents supplied as through pipes 31 and 32 are kept in suspension in the liquid in the mixing and reaction zone 33 until some desired concentration thereof in the slurry is reached and thereafter removed, as through the concentrator 27, at a rate to maintain the desired concentration. It is also known that clarified water will escape from such a slurry readily if a proper escape surface is provided. In the present instance such a surface is provided due to the lateral discharge of slurry as from the pipes 17. Such a lateral discharge of slurry and formation thereby of a clear water escape surface is not in itself new, having been used before as in my Patent #2,425,371, dated August 12, 1947, and is not of itself claimed herein. The clear water rises from this surface to overflow into launder 29 and so to pipe 30.

It is very desirable and in most cases necessary that the amount of slurry lifted by the pumping member of the rotor 11 into chamber 7 and discharged as through pipes 17 exceeds the amount required to contain the amount of clear water rising to the outlet, and preferably this discharge will be of the order of from about 1½ to about 3 times the normal throughput. This excess serves two purposes. On the one hand it has the effect of creating and maintaining better conditions for clear water escape. On the other hand it provides for a down flow between or through the baffles 16, which has the very desirable and even necessary effect of preventing the disturbance, and particularly the rotation of the liquid that exists in space 33, from unduly extending up to the slurry surface. Such a down flow permits the baffles 16 to be spaced farther apart and so reduces their number and cost, and also permits omission of radial baffles which would otherwise be required to prevent undue rotation reaching into the space above baffles 16, although of course radial stilling baffles may be employed if desired.

The operation of the apparatus as so far described will be readily understood from what has already been said, but will now be briefly summarized. The liquid to be treated entering through pipe 24 and delivered as through slot 26 is generally mixed with the treating reagents, supplied as through either or both of the pipes 31 and 32, depending upon the treatment desired, and is mixed with the slurry in the mixing and reaction chamber 33, due to the agitation and circulation resulting from the action of the rotating blades 15. The reaction takes place in the mixing and reaction chamber in the desired manner in the presence of and at or on the surfaces of the particles in the slurry. At the same time slurry is continuously withdrawn out of chamber 33 by the pumping head of rotor 11 and discharged into chamber 7, and then through openings 18 or pipes 17 above the baffle or partition structure into the annular chamber surrounding cylinder 8, where the throughput quantity of clear water escapes and rises to the outlet, while the excess of this slurry descends between or through the baffles to the treating chamber below, carrying what solids are left behind by the escaping clear water. This return flow serves also to inhibit the strong currents existing below the baffles from unduly extending up into the shallow slurry zone over the baffles. It is this return flow and its effect that permits minimizing the number and size of the baffles 16 so that they need be little more than deflecting plates to prevent the outward flow from the blades 15 from expanding upwardly. In the drawing these ring baffles 16 are shown as placed at an angle of about 45° but this is not limiting. They can at least in some cases be vertical although this may require a greater number of baffles, and they can be flatter, and even may be horizontal.

In the modified form of my invention shown in Figure 5, the partition structure is formed by an annular plate 35, extending from the conduit 25 to the tank wall 2, above the discharge opening 26, and suitably supported on hangers 36, secured to and depending from the deflecting plates 20, 20. Said annular plate may be of a sectional construction for ease in construction and assembly of the apparatus and is provided with a plurality of flow passageways 37 leading therethrough, which provide open but restricted vertical communication between the upper and lower sections of the tank, to permit the excess slurry to descend therethrough to the mixing and reaction zone 33. Otherwise the apparatus is the same as that described in connection with Figures 1 to 4 and the same part numbers will be applied to Figures 5 and 6 that were applied to corresponding parts in Figures 1 to 4. The operation of the modified form of apparatus shown in Figures 5 and 6 will be readily apparent from the description of the operation of the apparatus shown in Figures 1 to 4 so need not be described further.

While I have herein shown and described several ways in which my invention may be embodied, I wish it to be understood that I may depart from the forms shown and described without departing from the spirit and scope of my invention, and I do not wish to be construed as limiting myself to the specific forms shown except as expressly limited in the appended claims.

I claim:

1. Liquid treating apparatus of the lateral flow slurry type comprising a tank, means for withdrawing treated liquid from the upper portion of said tank, means for agitating the contents of the lower part of said tank, a partition structure extending substantially horizontally across the cross sectional area of said tank, a plurality of constantly open passageways through said partition structure, liquid inlet means discharging into said tank below said partition structure, means for delivering reagent to the liquid to be treated in said tank, means including a pump adapted to pump liquid from the part of said tank below said partition structure through one of said passageways into the part of said tank above said partition structure and for discharging it laterally at an elevation above said partition structure, the capacity of said pump being in excess of the rated throughput of said tank, and solids outlet means from said lower part of the tank.

2. Liquid treating apparatus of the type wherein the liquid is treated in and by a slurry containing liquid undergoing treatment and particles separated and accumulated in suspension therein from previously treated liquid, comprising a tank having a floor and a side wall, means for withdrawing treated liquid from a level adjacent the top of said side wall, a flow distribution chamber in the central part of said tank, said chamber having a bottom spaced above the floor of said tank and a boundary wall extending from said bottom to an elevation above said means for withdrawing treated liquid, baffle members surrounding the lower part of said chamber and spaced serially outwardly therefrom toward said side wall, said tank having a mixing and reaction space in its lower portion below said chamber and baffle members, a shaft extending downwardly in said flow distribution chamber, a driving motor for said shaft, agitator blades mounted on said shaft and extending into said mixing and reaction space, raw water inlet means discharging to said mixing and reaction space, means for introducing reagent to the water to be treated, an inlet passageway into said flow distribution chamber from the mixing and reaction space, an outlet passageway from said chamber discharging to the space above said baffle members, a pumping member also mounted on said shaft and adapted to pump slurry through said inlet passageway into said chamber, and a discharge to waste from said mixing and reaction space.

3. In a liquid treating apparatus of the type comprising a tank having a slurry holding space normally filled with slurry and a superposed clarified liquid space and a slurry escape face between said slurry holding space and said clarified liquid space, a mixing and reaction chamber in the lower portion of the slurry holding space of said tank, an agitator in said mixing and reaction chamber, inlet means for delivering raw liquid and treating reagent to said mixing and reaction chamber, waste outlet means leading from said mixing and reaction chamber, and treated liquid outlet means leading from the clarified liquid space of said tank, a partition structure extending across the cross sectional area of said tank, said partition structure being entirely within said slurry holding space at an elevation below the slurry escape surface and above said mixing and reaction chamber, said mixing and reaction chamber extending across the entire cross sectional area of said tank and being free of partitions that restrict horizontal circulation, a plurality of passageways through said partition structure permitting passage of liquid and solids between the upper and lower portions of said slurry holding space over the major part of the area covered by said partition structure, and means including a power driven pumping member adapted to pump slurry from said mixing and reaction chamber through one of said passageways to the upper portion of said slurry holding space above the partition structure and discharge it above and laterally across said partition structure.

4. A liquid treating apparatus of the type wherein the liquid is retained during treatment in a pool of slurry containing liquid undergoing treatment and particles separated and accumulated in suspension therein from previously treated liquid, the apparatus comprising a tank having a floor and a side wall, inlet means for raw liquid into the slurry containing part of said tank, a waste outlet from the lower part of said tank, means for withdrawing treated water from the upper part of said tank and determining the normal operating level of liquid within said tank, and a reagent delivery line for delivering reagent to the liquid to be treated, a mixing and reaction chamber in said tank occupying substantially the entire lower cross sectional area thereof and a relatively quiescent zone occupying the major portion of the upper cross sectional area thereof; said apparatus being characterized by a partition structure including a flow distribution chamber in the upper central part of said tank and baffles surrounding the lower portion of said flow distribution chamber and spaced serially outwardly therefrom to adjacent the wall of the tank, a passageway from said mixing and reaction chamber into said flow distribution chamber, a pumping member adapted to pump slurry from said mixing and reaction chamber through said passageway into said flow distribution chamber, passageway from said flow distribution chamber discharging radially above said baffles, an agitator in said mixing and reaction chamber, and motor means for operating said pump and said agitator.

5. A liquid treating apparatus of the slurry type wherein a pool of slurry is maintained containing liquid undergoing treatment and suspended solids accumulated from previously treated liquid, the upper surface of which pool of slurry forms a clear water escape surface, said apparatus including a tank having a floor and a side wall, means for introducing liquid to be treated and reagent to the slurry holding part of said tank, treated liquid outlet means adjacent the upper part of said tank and a lower waste discharge; said apparatus being characterized by a flow distribution chamber having a bottom above the floor of said tank and a wall extending from said bottom to an elevation above said treated liquid outlet means, said bottom having an inlet opening, a pump member adapted to pump slurry into said chamber through said inlet opening, agitating means in the space below said chamber and adapted to establish a vortex type circulation in the lower part of the tank, baffle means positioned laterally from said distribution chamber to adjacent the side wall of said tank and confining the vortex circulation to the space within said tank below said baffle means, a plurality of passageways through said baffle means affording communication between the spaces above and below said baffle means, and discharge passageways opening from said flow distribution chamber at an elevation above said baffle means to deliver slurry into the space above said baffle means.

6. An apparatus in accordance with claim 5 wherein the discharge passageways include pipes extending laterally from said flow distribution chamber, and wherein each of said pipes has at least one discharge opening along its underside.

7. An apparatus in accordance with claim 5 wherein the discharge passageways include pipes extending laterally from said flow distribution chamber, each pipe having at least one discharge opening along its underside, and wherein deflecting plates are spaced beneath and extend along the undersides of said pipes to deflect the liquid discharged therefrom.

8. An apparatus in accordance with claim 5 wherein the baffle means include a plurality of plate members that encircle said distribution chamber and are spaced to leave flow passageways therebetween.

9. In a liquid treating apparatus of the type wherein liquid and a treating reagent are introduced into a pool of slurry containing liquid undergoing treatment and suspended particles retained and accumulated in suspension therein from previously treated liquid, and wherein said pool of slurry has a definite upper surface from which clear liquid escapes: a treating tank having a floor and a side wall, a mixing and reaction chamber in the lower slurry holding portion of said tank, raw liquid inlet means discharging to the mixing and reaction chamber, means for delivering a reagent to the liquid to be treated, treated liquid outlet means adjacent the upper part of said tank and a lower waste discharge outlet, an agitator in said mixing and reaction chamber, and a horizontally extending baffle structure across the slurry holding portion of said tank at an elevation beneath the upper surface of the slurry and above said mixing and reaction chamber, said baffle structure including a plurality of vertically extending annular members, said annular members having upper and lower sections spaced apart to leave longitudinal gaps between said sections.

10. A slurry type liquid treating apparatus wherein a pool of slurry is maintained containing liquid undergoing treatment and particles separated and accumulated in suspension therein from previously treated liquid and having a clearly defined slurry surface from which clarified liquid escapes, comprising a tank having a floor and a vertically extending side wall, means for withdrawing clarified liquid from the upper part of said tank and waste discharge means leading from a lower portion of said tank: characterized by a flow distribution chamber supported within said tank and having a bottom spaced above the floor of said tank and a side wall extending upwardly to an elevation above said clarified liquid outlet, a baffle structure surrounding said distribution chamber and extending horizontally outwardly therefrom across said pool of slurry to the side wall of the tank, said chamber having an inlet from the space within said tank below said chamber, a motor driven rotor, said rotor having a pumping member positioned to pump slurry through said inlet into said chamber, agitator means in said space below said chamber setting up, upon rotation thereof, a vortex type circulation of slurry in said space outwardly toward the side wall of said tank subjacent said baffle structure and inwardly from said side wall along the floor of said tank, said baffle structure confining said circulation to the lower part of said tank, passageways in said baffle structure permitting flow from the space above to the space below said baffle structure, means for introducting liquid to be treated and treating reagent into the space below said baffle structure, and outlet means from said distribution chamber discharging at an elevation above said baffle structure whereby to laterally distribute slurry from said chamber in the region above said baffle structure and thereby to maintain the slurry surface in the space above said baffle structure.

11. An apparatus in accordance with claim 10 wherein the baffle structure comprises a flat plate having a plurality of passageways leading therethrough.

12. An apparatus in accordance with claim 10 wherein the outlet means from said distribution chamber includes a pipe communicating with chamber and extending laterally from the distribution chamber and having a slurry discharge opening in its underside, and a horizontal deflecting plate beneath said slurry discharge opening deflecting the discharged slurry laterally therefrom.

13. An apparatus in accordance with claim 10 wherein the baffle structure comprises a plurality of inclined vertically extending annular members, said members being laterally spaced to form flow passageways therebetween.

14. An apparatus in accordance with claim 13 wherein said annular members are of a hollow frusto conical form, each of said annular members being divided into upper and lower sections spaced vertically apart so as to provide a longitudinal gap therebetween.

15. In a process for the treatment of liquids wherein treatment takes place in a body of slurry containing particles retained from previously treated liquid and accumulated in suspension in a body of liquid undergoing treatment, said body of slurry being maintained in condition by the continuous addition thereto of liquid to be treated and treating reagent, the removal to waste of surplus particles therefrom and the continuous escape of treated liquid from its upper surface, the improvement that comprises dividing said body of slurry into a horizontal lower and deeper section and an upper and shallower section, said sections being in open but restricted vertical communication, applying mechanical energy in the lower section in a manner to produce agitation and circulation of the slurry therein including an upper outward flow along the upper portion of said lower section and an inward flow along the lower portion of said lower section, pumping slurry from said lower section into said upper section in an amount considerably in excess of treated liquid escape, and distributing the slurry in a lateral flow in the lower portion of said upper section, and opposing any extension into said upper section of the turbulence set up by the circulation in the lower section by returning slurry from the upper lateral flow to the lower lateral flow in a plurality of downward streams.

16. Liquid treating apparatus of the lateral flow slurry type comprising a tank, means for withdrawing treated liquid from the upper portion of said tank, power driven agitating means extending into the lower part of said tank and setting up, upon operation thereof, in said lower part of the tank a vortex flow having its outward component at the level of said agitating means, a partition structure extending substantially horizontally across the cross sectional area of said tank above but adjacent said level of said outward component, a plurality of constantly open passageways through said partition structure, liquid inlet means discharging into the said lower part of said tank, means for delivering reagent to the liquid to be treated in said tank, means including a pump adapted to pump liquid from the part of said tank below said partition structure through one of said passageways into the part of said tank above said partition structure and to discharge it laterally above and across said partition structure, the capacity of said pump being in excess of the rated throughput of said tank, and solids outlet means from said lower part of the tank.

WALTER H. GREEN.

REFERENCES CITED

The following references are of record in the file of this patent:

UNITED STATES PATENTS

| Number | Name | Date |
|---|---|---|
| 2,325,679 | Hughes | Aug. 3, 1943 |
| 2,391,738 | Prager | Dec. 25, 1945 |
| 2,425,371 | Green | Aug. 12, 1947 |
| 2,425,372 | Green | Aug. 12, 1947 |
| 2,427,886 | Walker | Sept. 23, 1947 |